US012044139B1

(12) United States Patent
Jepson et al.

(10) Patent No.: US 12,044,139 B1
(45) Date of Patent: Jul. 23, 2024

(54) IMMOBILISATION TOOL

(71) Applicant: ROLLS-ROYCE plc, London (GB)

(72) Inventors: Thomas Jepson, Derby (GB); Jack Brooks, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/820,702

(22) Filed: Aug. 18, 2022

(30) Foreign Application Priority Data

Aug. 23, 2021 (GB) ..................................... 2112031

(51) Int. Cl.
*F01D 5/02* (2006.01)

(52) U.S. Cl.
CPC ........ *F01D 5/026* (2013.01); *F05D 2220/323* (2013.01); *F05D 2230/70* (2013.01); *F05D 2240/60* (2013.01); *F05D 2260/30* (2013.01); *F05D 2260/36* (2013.01); *F05D 2260/37* (2013.01)

(58) Field of Classification Search
CPC ............... F01D 25/285; F05D 2230/70; F05D 2230/72; F05D 2230/80; F05D 2260/30; F05D 2230/36; F05D 2260/37
See application file for complete search history.

(56) References Cited

U.S. PATENT DOCUMENTS

| | | | | | |
|---|---|---|---|---|---|
| 3,672,708 | A * | 6/1972 | Zemberry | F16L 37/084 403/361 |
| 4,456,425 | A * | 6/1984 | McCarty | F02C 7/32 74/416 |
| 6,338,578 | B1 | 1/2002 | Adde et al. | |
| 7,128,529 | B2 | 10/2006 | Le Jeune et al. | |
| 2008/0062572 | A1 * | 3/2008 | Hanrahan | F16C 27/00 |
| 2012/0151735 | A1 | 6/2012 | Thomas | |
| 2019/0128119 | A1 | 5/2019 | Oren et al. | |

OTHER PUBLICATIONS

Jan. 27, 2023 extended Search Report issued in European Patent Application No. 22186600.7.

* cited by examiner

*Primary Examiner* — Christopher J. Besler
(74) *Attorney, Agent, or Firm* — Oliff PLC

(57) ABSTRACT

A tool for immobilising a first shaft of a gas turbine engine in relation to a second shaft of a gas turbine engine, the tool comprising a cylindrical body having a first end and a second end opposite the first end, the cylindrical body having one or more interior protrusions on the inner surface of the cylindrical body for engaging with the first shaft, and the outer surface of the cylindrical body having one or more exterior protrusions for engaging with the second shaft, the tool being configured such that at least part of the tool can be inserted within and held fixed relative to a section of the second shaft, and a section of the first shaft can be inserted within and held fixed relative to the interior of the cylindrical body.

9 Claims, 12 Drawing Sheets

IMMOBILISATION TOOL

CROSS-REFERENCE TO RELATED APPLICATIONS

This application claims priority pursuant to 35 U.S.C. 119(a) to United Kingdom Application No. 2112031.6, filed Aug. 23, 2021, which application is incorporated herein by reference in its entirety.

BACKGROUND

Field of the Disclosure

The present disclosure relates to a tool for immobilising a first shaft of a gas turbine engine in relation to a second shaft of the gas turbine engine, and an associated method.

Description of the Related Art

Aircraft engines are designed to provide many years of operation, and as part of that it is necessary to provide them with periodic servicing and occasional repairs. Sometimes it is necessary to strip down the engine and then rebuild it as part of these processes. Stripping and rebuilding an engine is a complex and time-consuming process, especially when accessing components deep within the engine structure. Because many components within the engine are designed to rotate freely, it is often necessary to immobilise parts of the engine before they, or pieces they are attached to, can be removed.

It would be beneficial to simplify and/or speed up the process for stripping or rebuilding and engine, as saving time and resources required to perform this task also means saving money for the operator.

SUMMARY OF THE DISCLOSURE

According to a first aspect there is provided a tool for immobilising a first shaft of a gas turbine engine in relation to a second shaft of a gas turbine engine, the tool comprising a cylindrical body having a first end and a second end opposite the first end, the cylindrical body having one or more interior protrusions on the inner surface of the cylindrical body for engaging with the first shaft, and the outer surface of the cylindrical body having one or more exterior protrusions for engaging with the second shaft, the tool being configured such that at least part of the tool can be inserted within and held fixed relative to a section of the second shaft, and a section of the first shaft can be inserted within and held fixed relative to the interior of the cylindrical body. Such a tool is advantageous in the servicing of gas turbine engines, as it reduces the number of parts that need to be removed in order to access certain interior components within the engine, saving time and money for the operator.

The tool may further comprise a backstop on the exterior surface of the cylindrical body to limit longitudinal movement of the tool in one direction with relation to the second shaft. The backstop can be useful in providing consistent positioning of the tool in relation to the shafts. The backstop may be integral with the exterior protrusions.

Optionally, the interior protrusions of the tool may be at the first end of the cylindrical body. Optionally, the exterior protrusions may be at the second end of the cylindrical body. The arrangement of the protrusions can be adjusted dependent upon the configuration of the shafts being immobilised.

Optionally, the tool may comprise stainless steel.

The tool may further comprise a securing device configured to receive a second section of the first shaft and to create an interference fit with the cylindrical body so as to fix the cylindrical body axially with respect to the first and second shaft. Such a securing device may be helpful in providing consistent positioning of the tool in relation to the shafts, and preventing the tool from becoming prematurely uncoupled from either shaft. The securing device may be a threaded nut.

In a second embodiment of the present disclosure, there is disclosed a method for removing a first component from a gas turbine engine, the first component being fixed to a first shaft, the method comprising removing the fan case, removing the fan disc, fixing the tool of any preceding claim between the first shaft and a second shaft connected to a second component so as to immobilise the first shaft in relation to the second shaft, and therefore the first component with relation to the second component, immobilising the second component, and removing the first component. Such a method is advantageous in the servicing of gas turbine engines, as it reduces the number of parts that need to be removed in order to access certain interior components within the engine, saving time and money for the operator.

The first shaft can be an intermediate-pressure shaft, and the first component can be an intermediate pressure compressor module. The second shaft can be a low-pressure turbine shaft, and the second component can be a low-pressure turbine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The gas turbine engine as described and/or claimed herein may have any suitable general architecture. For example, the gas turbine engine may have at least two shafts that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
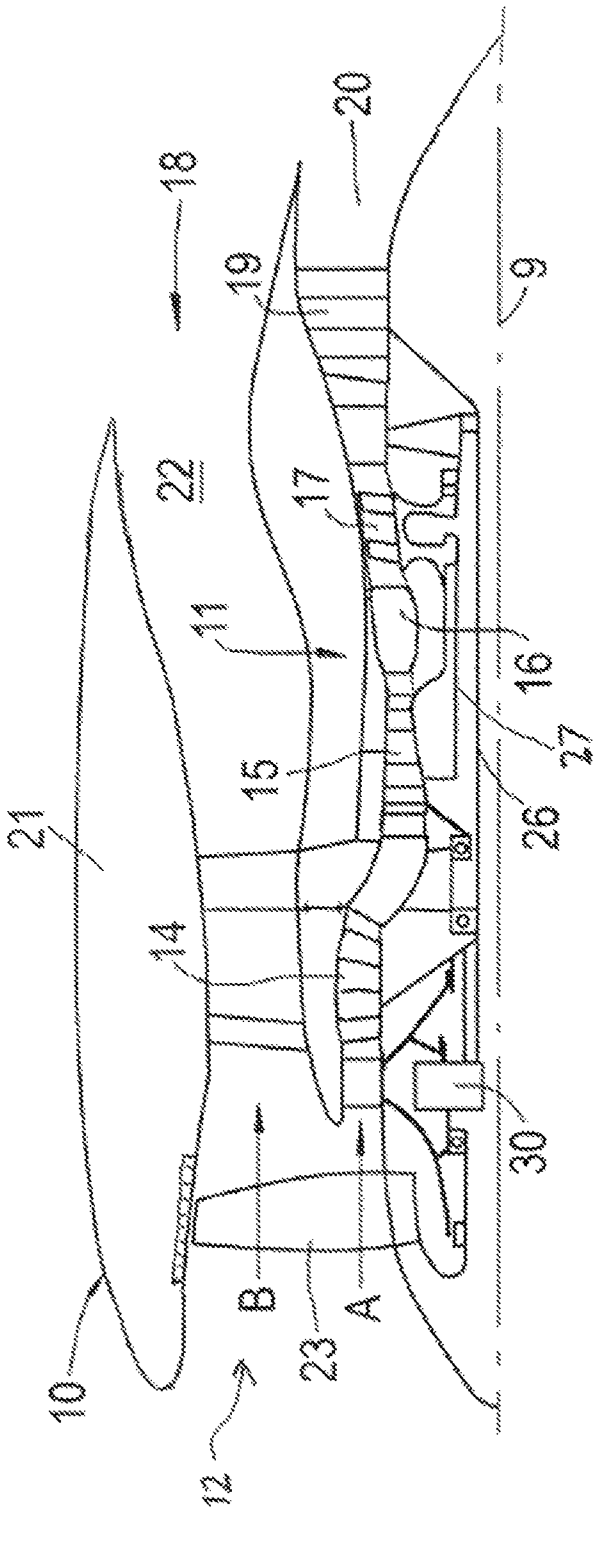
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
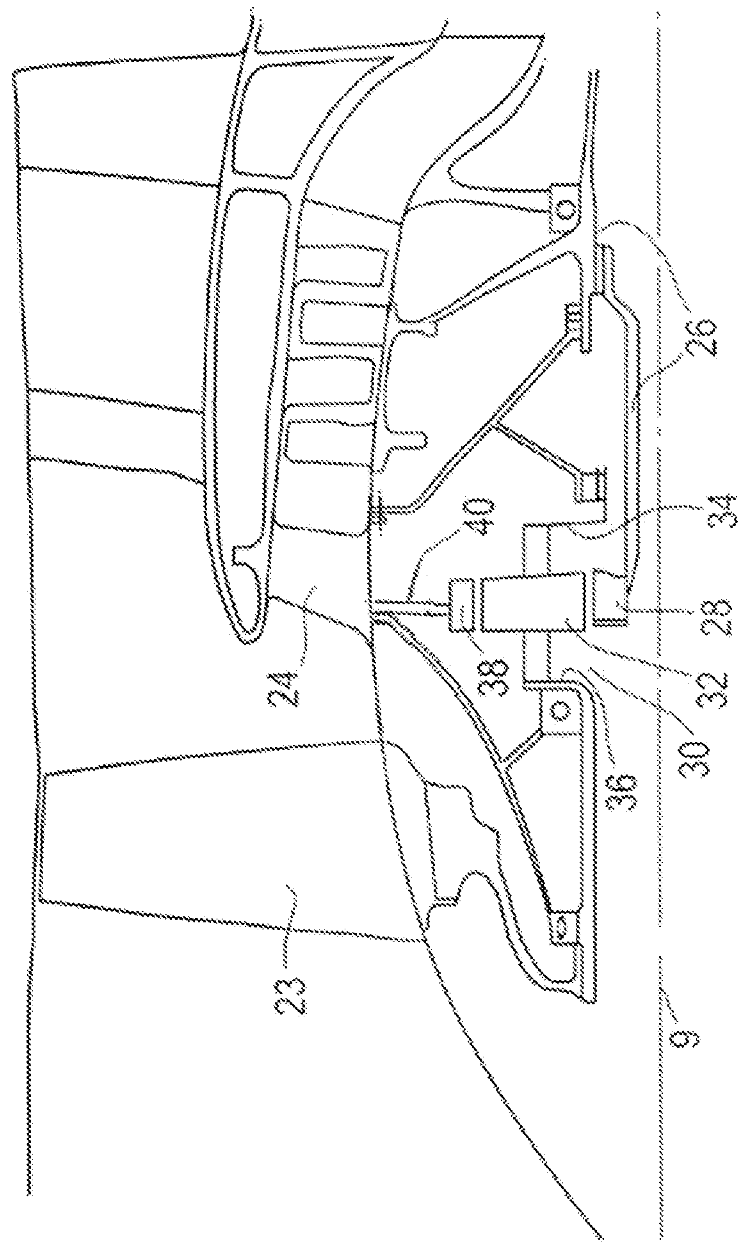
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
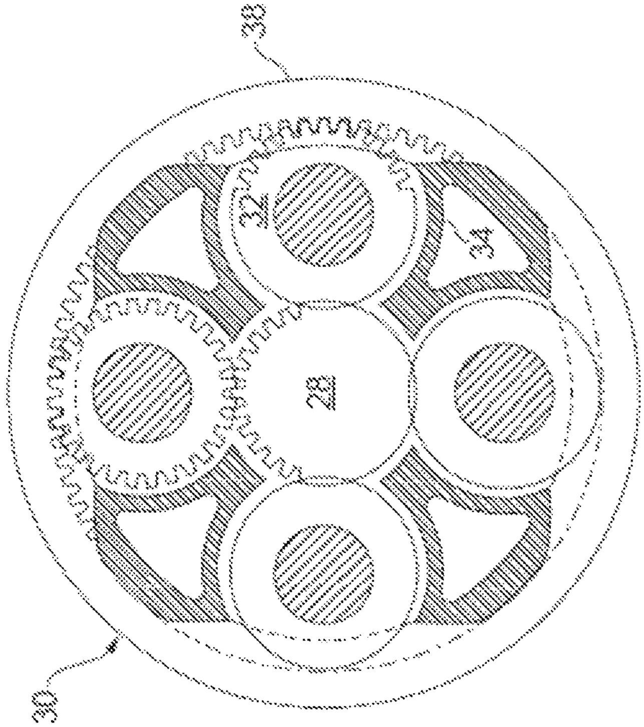
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The tool of the present disclosure is used during the processes of disassembling or reassembling an engine, for example of any of the types previously described. Indeed, the tool can be used in any gas turbine engine system comprising two or more independently rotating shafts that require immobilising for the purposes of building/disassembling the rotating assembly. This could be for example a 2-shaft or 3-shaft engine design.

Figure 4:
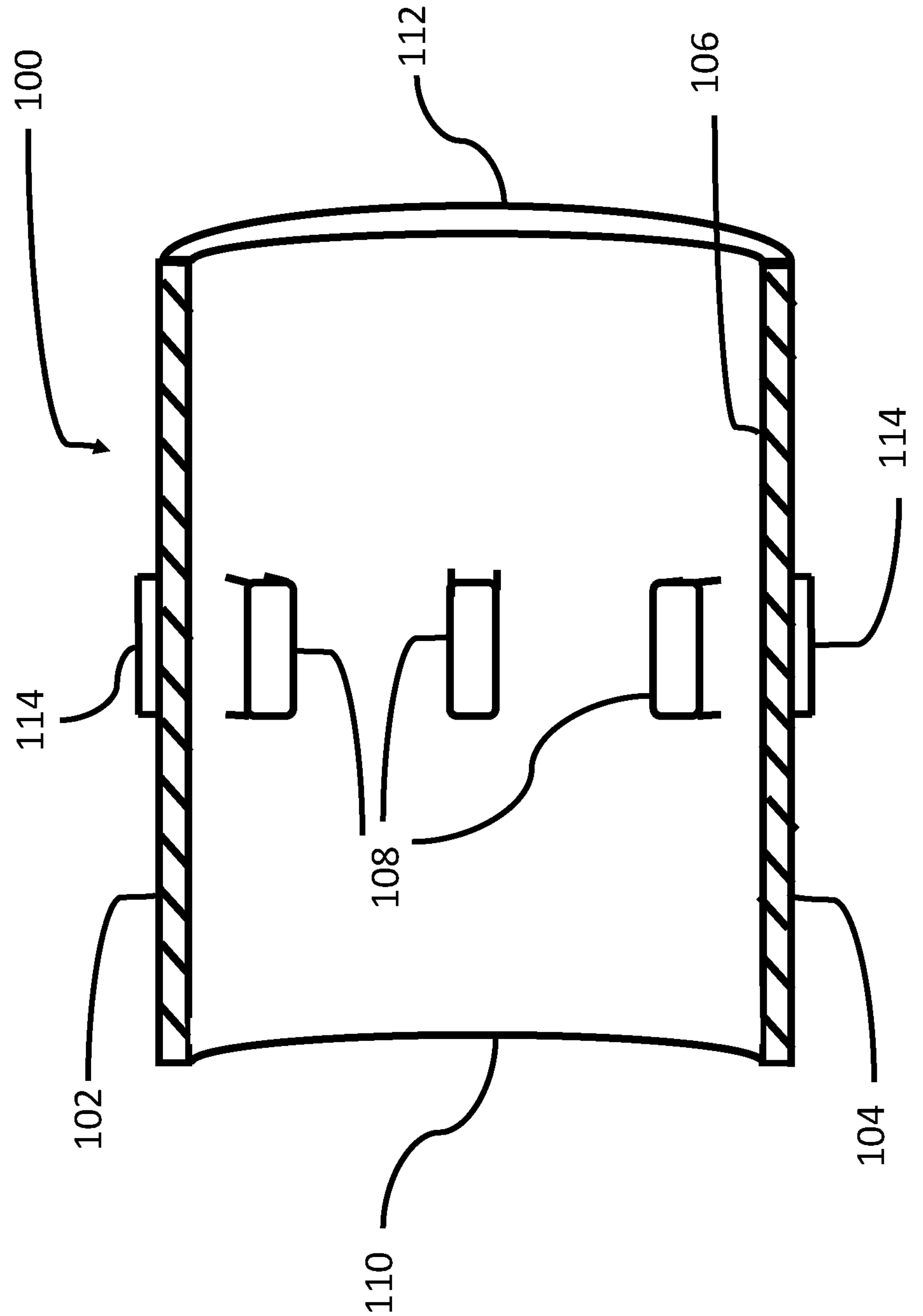
FIG. 4 is a sectional view of an embodiment of the tool of the present disclosure.

The tool of the present disclosure is designed to immobilise one shaft with respect to another. As such, the tool has a generally cylindrical design so that it can be positioned concentrically between a first and second shaft of the gas turbine engine. FIG. 4 shows a side-on cut-through view of a tool 100 according to the present disclosure. The tool 100 comprises a generally cylindrical body 102, with an outer surface 104, an inner surface 106, a first end 110 and a second end 112 opposite the first end 110. On the inner surface are a number of interior protrusions 108. In FIG. 4 only three interior protrusions 108 are shown on the half of the tool that is visible, but it is to be understood that any number can be present within the tool, including a single interior protrusion, if it is dimensioned appropriately. The interior protrusions 108 are aligned axially within the body 102, so as to form a circle of interior protrusions 108 within the tool 100. On the outer surface 104 there are a number of exterior protrusions 114. Only two are shown in FIG. 4, but it is to be understood that any number can be present on the tool, including a single exterior protrusion, if it is dimensioned appropriately.

In use, the body 102 of the tool 100 is passed over a section of a first shaft of the engine 10, for example the low-pressure turbine shaft 26. The outer surface of the section of the low-pressure turbine shaft 26 comprises a number of slots equal or greater than the number of interior protrusions 108 on the tool, and the low-pressure turbine shaft 26 and/or tool 100 is rotated until each of the interior protrusions 108 is aligned with a slot on the outer surface of the low-pressure turbine shaft 26. The interior protrusions 108 of the tool are then slotted into the slots on the outer surface of the low-pressure turbine shaft 26 such that the tool 100 and the low-pressure turbine shaft 26 are interlocked, and fixed relative to one another.

Next, or simultaneously, the tool 100 is brought into contact with a section of a second shaft 132 of the engine 10, for example the interconnecting shaft 27. The inner surface of the section of the interconnecting shaft 27 comprises a number of slots equal to or greater than the number of exterior protrusions 114, and the interconnecting shaft 27 and/or tool 100 is rotated until each of the exterior protrusions 114 on the tool is aligned with a slot on the inner surface of the interconnecting shaft 27. The exterior protrusions 114 of the tool are then slotted into the slots on the inner surface of the interconnecting shaft 27 such that the tool 100 and the interconnecting shaft 27 are interlocked, and fixed relative to one another.

Figure 5:
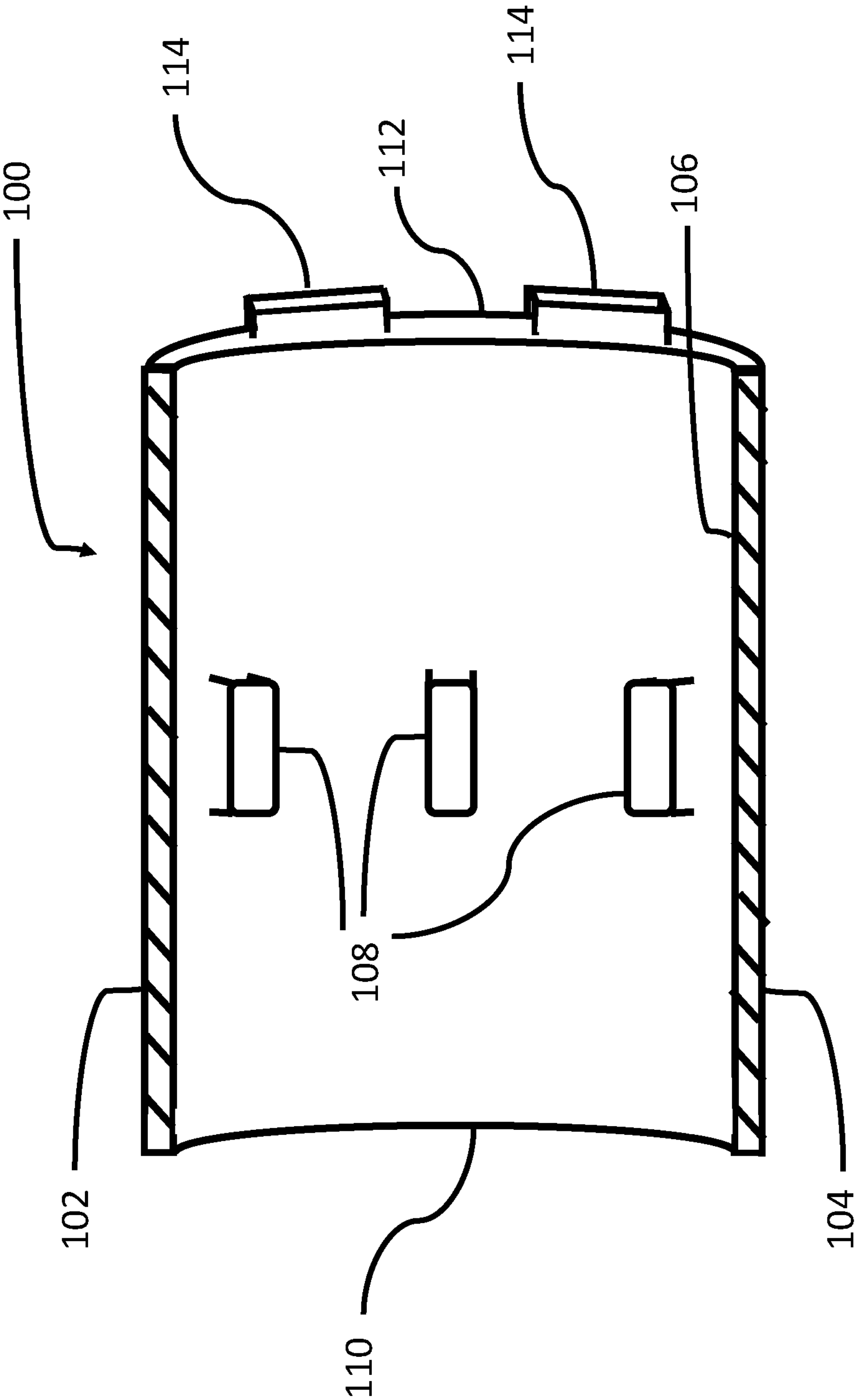
FIG. 5 is a sectional view of an alternative embodiment of the tool of the present disclosure.
Figure 6:
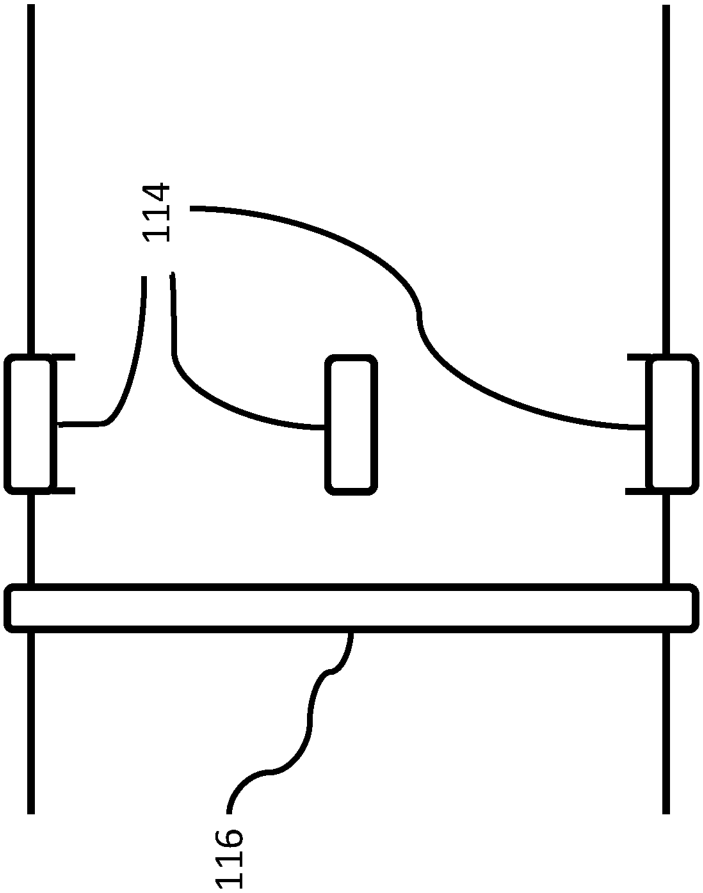
FIG. 6 is a side-on view of the exterior of an embodiment of the tool of the present disclosure.

In an alternative embodiment shown in FIG. 5, the exterior protrusions 114 can be positioned on one of the first 110 or second 112 ends of the body 102, such that they protrude axially along the length of the body. In the example shown in FIG. 5, the exterior protrusions 114 extend from the second end of the body 102 of the tool 100. In this case, either the end surface or interior surface of the interconnecting shaft 27 comprises a number of slots equal to or greater than the number of exterior protrusions 114, and the interconnecting shaft 27 and/or tool 100 is rotated until each of the exterior protrusions 114 is aligned with a slot on the end surface or interior surface of the interconnecting shaft 27. The exterior protrusions 114 of the tool are then slotted into the slots on the end surface or interior surface of the interconnecting shaft 27 such that the tool 100 and the interconnecting shaft 27 are interlocked, and fixed relative to one another.

Where the exterior protrusions 114 are located on the outer surface 104 of the body 102, the outer surface may additionally comprise a backstop 116 such as that shown in FIG. 6. The backstop 116 provides a surface against which a surface of the interconnecting shaft 27 can come to rest once the exterior protrusions 114 of the tool 100 have been inserted into the corresponding slots of the interconnecting shaft 27. In this way the backstop provides a datum location to ensure consistent placing of the tool each time it is used.

Figure 7:
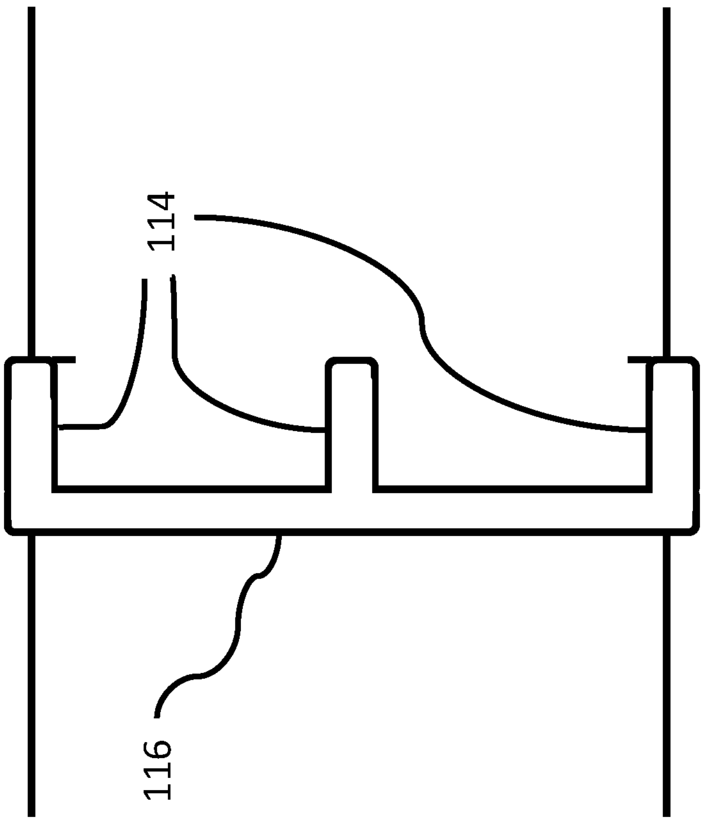
FIG. 7 is a side-on view of the exterior of an alternative embodiment of the tool of the present disclosure.

In an alternative embodiment shown in FIG. 7, the backstop 116 can be integral with the exterior protrusions 114.

Figure 8:
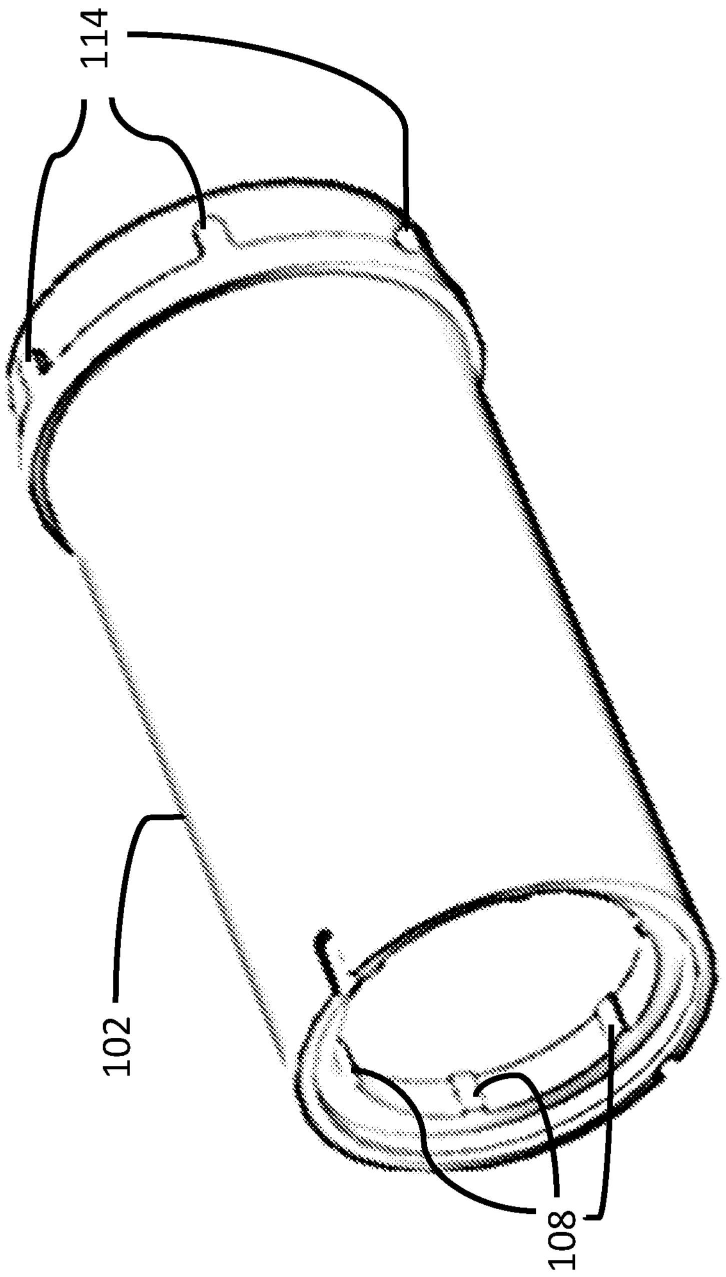
FIG. 8 is an isometric view of the exterior of a further embodiment of the tool of the present disclosure.

In an alternative embodiment shown in FIG. 8, the exterior protrusions 114 are all positioned towards a first end of the body 102 of the tool 100, while the interior protrusions 108 are all positioned towards a second end 112 of the body 102 of the tool 100 opposite to the first end. Such a configuration may be advantageous if the ends of the two shafts the tool is to be fitted between are within a distance of each other for which a tool can be readily constructed.

Figure 9:
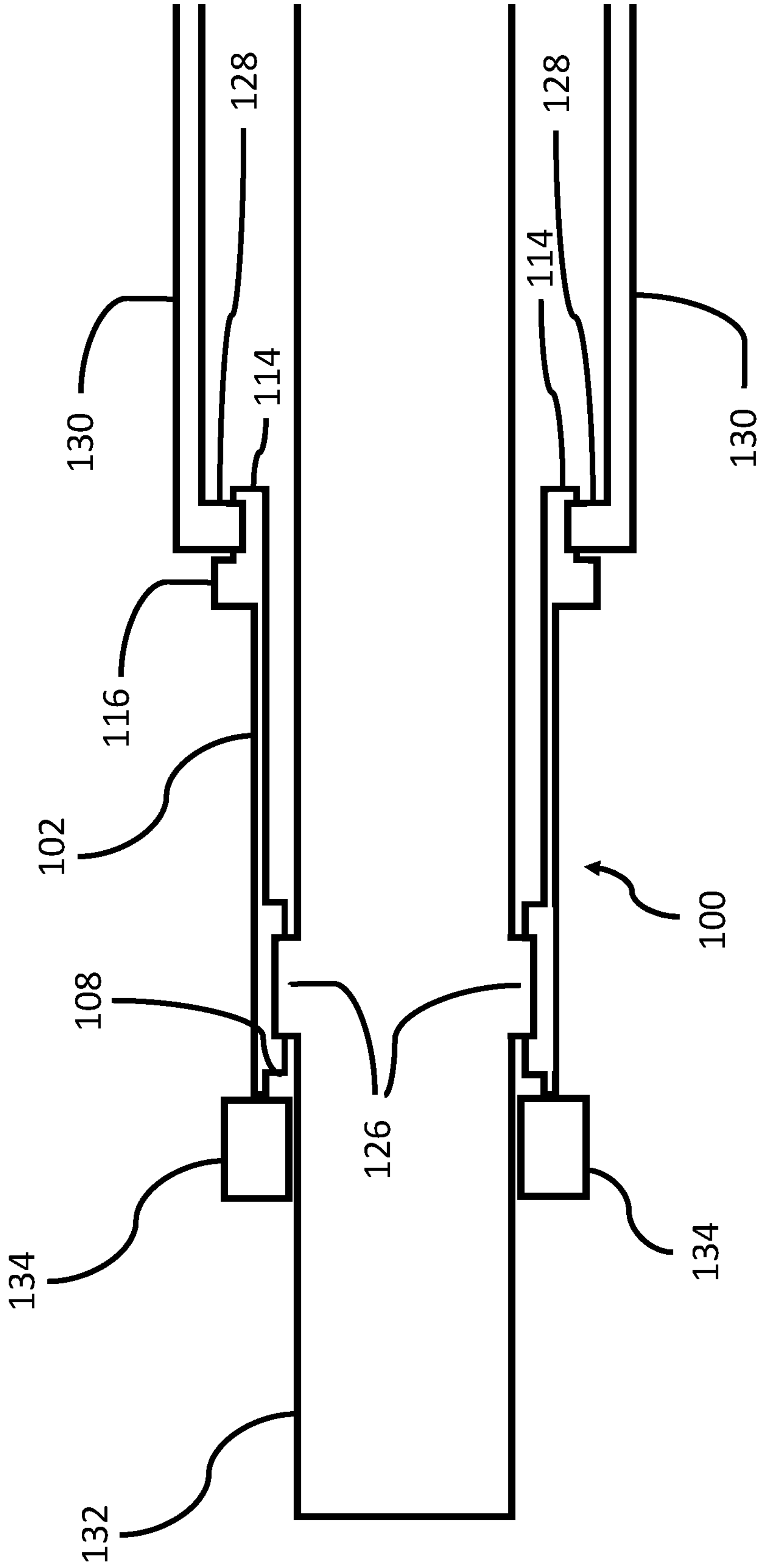
FIG. 9 shows a sectional view of an embodiment of the tool in use.

FIG. 9 shows in cross-section an example of how the tool embodiment 100 of FIG. 8 can be positioned so as to link two shafts, in this case a first shaft 130 and a second shaft 132, so as to immobilise them with respect to one another. The exterior protrusions 114 on the body 102 of the tool 100 engage with the first shaft slots 128 formed on the interior surface of the first shaft 130, whilst the interior protrusions 108 engage with slots 126 formed on the surface of the second shaft 132. With both the shafts 130, 132 engaged with the tool 100, immobilisation of one shaft will lead to the immobilisation of both shafts.

It will be readily apparent to the skilled person how the arrangement of protrusions and slots can be altered whilst still achieving the same effect. For example, in FIG. 10, the exterior protrusions 114 on the body 102 of the tool 100 are on the end surface and extend axially, as shown on the tool of FIG. 5. The axial protrusions are accommodated by having the first shaft slots 128 formed on the axially-facing end-surface of the first shaft 130. Alternatively, the first shaft slots 128 may be formed in the same position as that shown in FIG. 9, i.e. on the interior surface of the first shaft 130, with an axially-facing opening. In a further alternative, the slots of the first 130 and second 132 shafts may be positioned at the same axial location (i.e. in the same axial plane) relative to one another, such that the interior 108 and exterior 114 protrusions may also have the same or similar axial location on the body 102 of the tool 100, as shown for example in FIG. 4.

Figure 10:
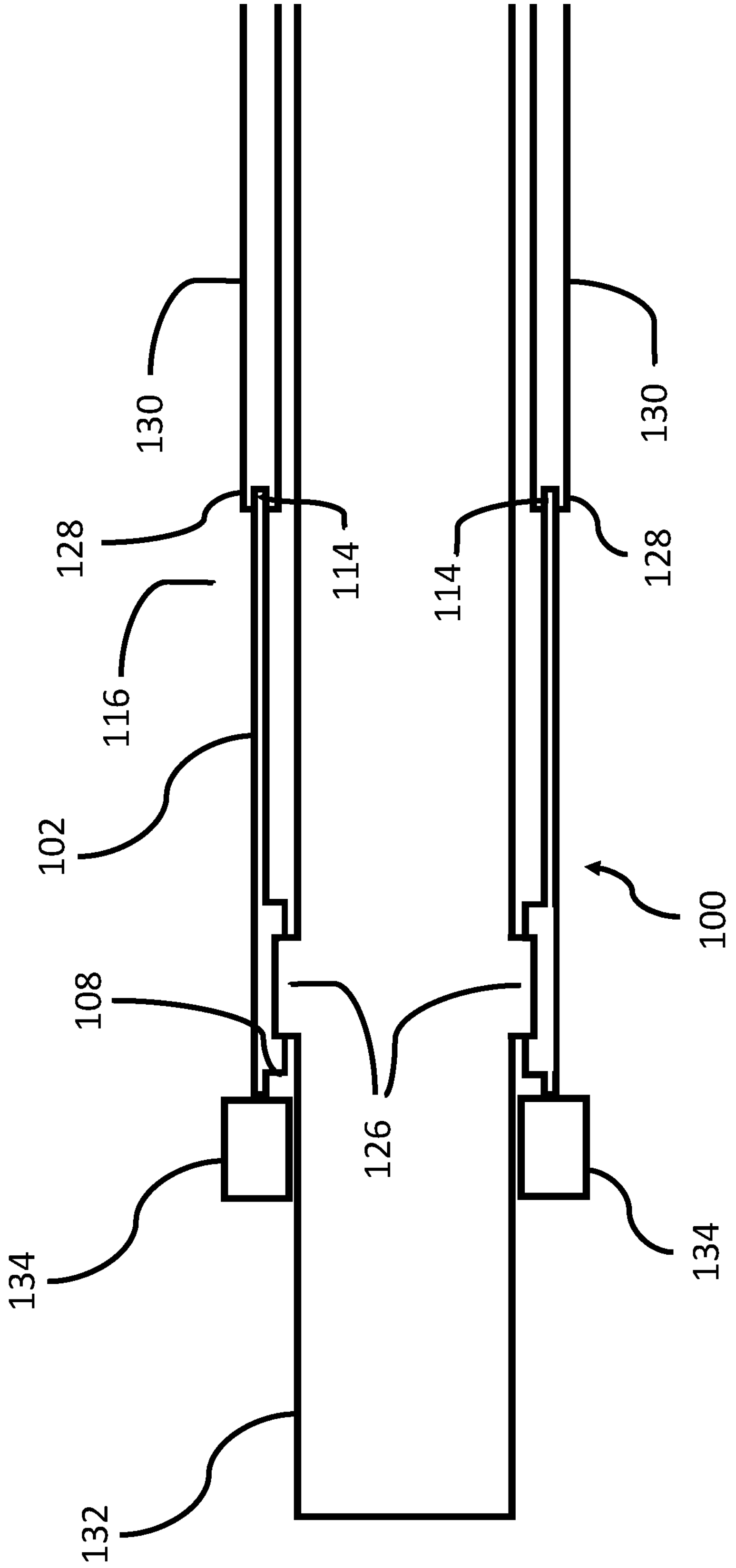
FIG. 10 shows a sectional view of an alternative embodiment of the tool in use.

FIGS. 9 and 10 also show an optional securing device 134, which can be used to help keep the body 102 of the tool 100 fixed once in place. The securing device can be positioned using an interference fit, or could be a threaded nut which is secured to a thread (not shown) on a second section of the exterior surface of the second shaft 132.

Figure 11:
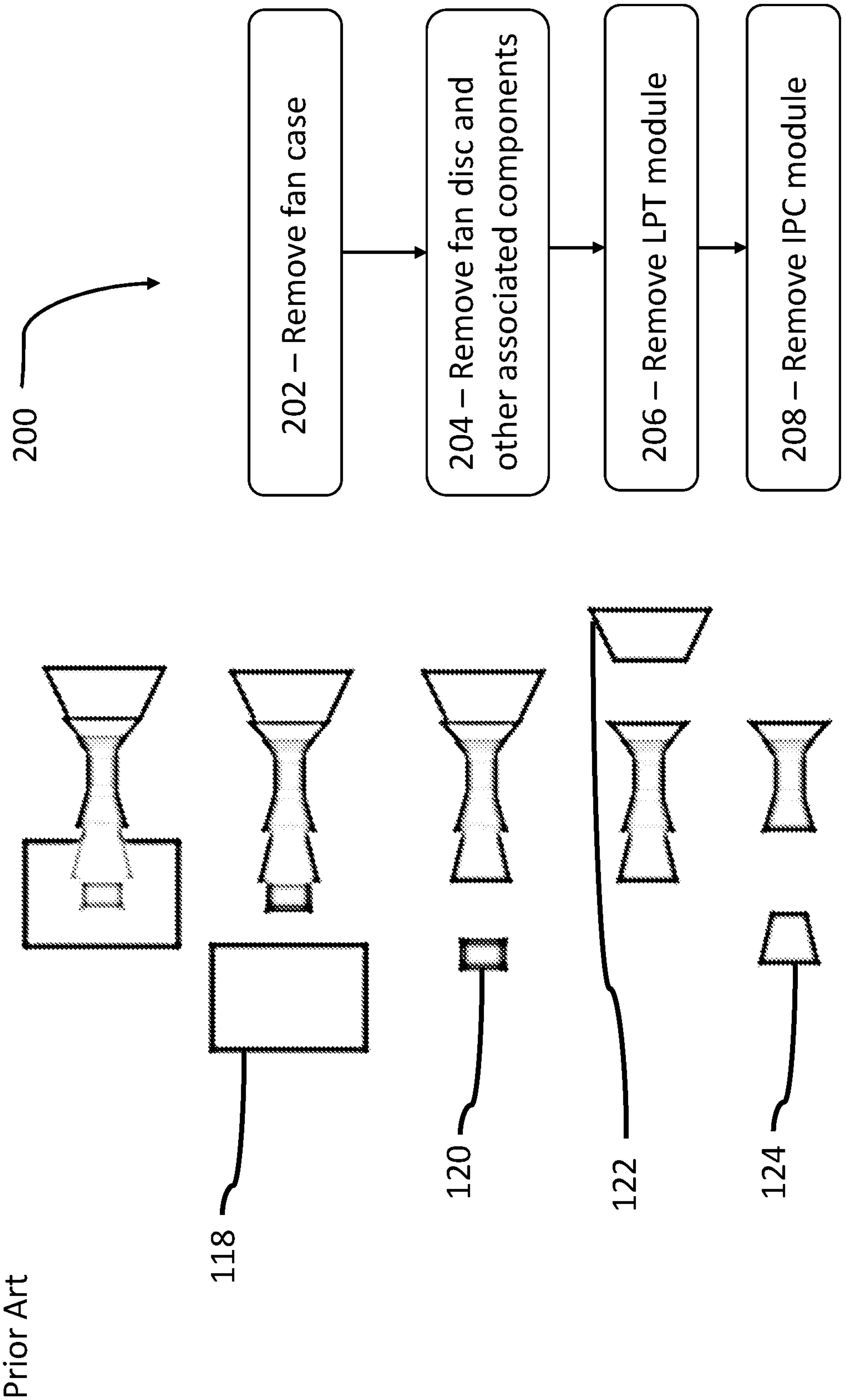
Prior Art FIG. 11
FIG. 11 illustrates a representation of a method for removing the intermediate pressure compressor (IPC) module from a gas turbine engine as known in the art.

FIG. 11 is a schematic illustration of a method 200 for removing an interior component, in this case the intermediate pressure compressor (IPC) module 124, from a gas turbine engine 10 according to the prior art. In a first step 202 the fan case 118 is removed from the front of the engine 10. In the second step 204 the fan disc and associated components 120 are also removed from the front of the engine. In the third step 206 the low-pressure turbine (LPT) module 122 is removed from the rear of the engine. Only once the LPT module has been removed can the intermediate-pressure compressor (IPC) module be removed in step four 208. This is because, before the IPC module can be removed, a further component (not shown) must be removed which otherwise will interfere with the IPC module removal process. The further component is directly linked to the intermediate pressure turbine (IPT) rotor, and is secured inside the IPC module by means of a threaded nut (not shown). In order to remove the nut, the further component, and ultimately the IPC module, the IPT rotor must be immobilised. In this known method of the prior art, the IPT rotor can only be accessed to be immobilised once the LPT module 122 has been removed. This is usually achieved by fitting an immobilising device (not shown) to the IPT module at the rear of the engine. With the IPT module immobilised, the nut can be removed, followed by the further component, and finally the IPC module.

Figure 12:
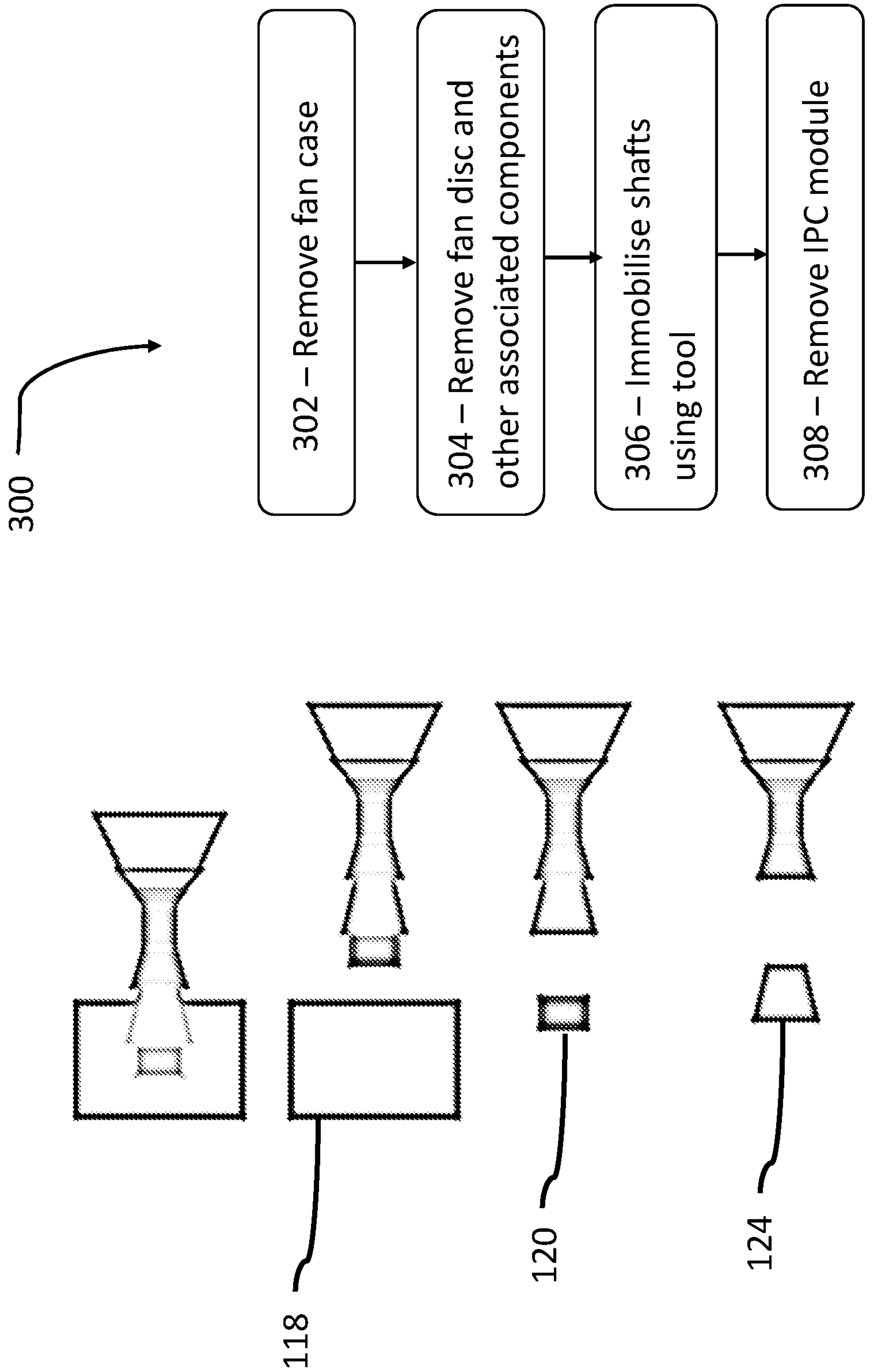
FIG. 12 illustrates a representation of a method for removing the intermediate pressure compressor (IPC) module from a gas turbine engine using the tool of the present disclosure.

FIG. 12 is a schematic illustration of a method 300 for removing an interior component such as the IPC from a gas turbine engine 10 according to the present disclosure. The first two steps 302, 304 are the same as those 202, 204 of the known prior art method 200. In a first step 302 the fan case 118 is removed from the front of the engine 10. In the second step 304 the fan disc and associated components 120 are also removed from the front of the engine. In the third step 306, the tool 100 of the present disclosure is fitted to the first and second shaft, i.e. the IPT and LPT shafts, so that they become fixed in relation to one another. Once this is done, the LPT module can be fixed in place using the immobilising device (not shown) previously used to immobilise the IPT module in the method of the prior art. Because the IPT and LPT shafts are now fixed in relation to each other by the tool 100, immobilising the LPT module also immobilises the IPT shaft via the LPT shaft, meaning the nut can be unscrewed, the further component can be removed, and ultimately in step four 308 the IPC module can be removed without the need for removing the LPT module first. The disclosed method is therefore less time-consuming than that of the prior art, saving time, resources, and cost for the operator.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A tool for immobilising a first shaft of a gas turbine engine in relation to a second shaft of the gas turbine engine, the tool comprising:

a cylindrical body having a first end and a second end opposite the first end, wherein:

the cylindrical body has an inner surface with at least one interior protrusion formed therein for engaging with the first shaft, and an outer surface having at least one exterior protrusion formed thereon for engaging with the second shaft, each of the at least one interior protrusion and the at least one exterior protrusion extending in an axial direction, a radial direction and a circumferential direction of the cylindrical body, the at least one interior protrusion and the at least one exterior protrusion are axially aligned with the at least one interior protrusion and the at least one exterior protrusion extending more in the axial direction than in the circumferential direction and the radial direction, each of the at least one interior protrusion and the at least one exterior protrusion has a first axial end and a second axial end with a line that connects the first axial end and the second axial end extending only in the axial direction, and the tool is configured such that at least part of the tool is insertable within and held fixed relative to a first section of the second shaft via the at least one exterior protrusion, and a first section of the first shaft can be inserted within and held fixed relative to the interior of the cylindrical body via the at least one interior protrusion; and a backstop on the outer surface of the cylindrical body to limit longitudinal movement of the tool in one direction with relation to the second shaft, wherein the backstop integral with and directly connected to the at least one exterior protrusion and the backstop is a flange that radially extends from the outer surface of the cylindrical body.

2. The tool of claim 1, wherein the at least one interior protrusion is at the first end of the cylindrical body.

3. The tool of claim 1, wherein the at least one exterior protrusion is at the second end of the cylindrical body.

4. The tool of claim 1, wherein the tool comprises stainless steel.

5. The tool of claim 1, further comprising a securing device, the securing device being configured to receive a second section of the first shaft and to create an interference fit with the cylindrical body so as to fix the cylindrical body axially with respect to the first shaft and the second shaft.

6. The tool of claim 5, wherein the securing device is a threaded nut.

7. The tool of claim 1, wherein the inner surface of the cylindrical body has a constant diameter from the first end to the second end.

8. The tool of claim 1, wherein the at least one interior protrusion and the at least one exterior protrusion axially overlap.

9. A tool for immobilising a first shaft of a gas turbine engine in relation to a second shaft of the gas turbine engine, the tool comprising:

a cylindrical body having a first end and a second end opposite the first end, wherein:

the cylindrical body has an inner surface with at least one interior protrusion formed therein for engaging with the first shaft, and an outer surface having at one exterior protrusion formed thereon for engaging with the second shaft, each of the at least one interior protrusion and the at least one exterior protrusion extending in an axial direction, a radial direction and a circumferential direction of the cylindrical body, the inner surface of the cylindrical body has a constant diameter from the first end to the second end, the at least one interior protrusion and the at least one exterior protrusion are axially aligned with the at least one interior protrusion and the at least one exterior protrusion extending more in the axial direction than in the circumferential direction and the radial direction, the at least one interior protrusion and the at least one exterior protrusion axially overlap, and the tool is configured such that at least part of the tool is insertable within and held fixed relative to a first section of the second shaft via the at least one exterior protrusion, and a first section of the first shaft can be inserted within and held fixed relative to the interior of the cylindrical body via the at least one interior protrusion; and a backstop on the outer surface of the cylindrical body to limit longitudinal movement of the tool in one direction with relation to the second shaft, wherein the backstop is integral with and directly connected to the at least one exterior protrusion and the backstop is a flange that radially extends from the outer surface of the cylindrical body.

* * * * *